BEST AVAILABLE COPY T858,018

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 724

664,925

MULTIFUNCTIONAL POLYMERIC ADDITIVE FOR MINERAL OILS

Norman Jacobson, 34 Peach Orchard Drive, East Brunswick, N.J. 08816

Filed Sept. 1, 1967. Published Jan. 21, 1969

Class 252—51.5

No Drawing. 31 Pages Specification

A hydrocarbon-oil-soluble polymeric additive having multifunctional qualities including viscosity-index-improving properties and sludge-dispersing properties is prepared by reacting an oil-soluble polymeric material, which contains acid or acid anhydride groups randomly distributed along the polymer chain, with a heterocyclic amino compound under conditions which cause the formation of an amide or imide linkage between carboxyl or carboxyl anhydride groups of the polymer and the amino groups of the heterocyclic amino compound. The latter is characterized as a heterocyclic amino compound of the psuedo-aromatic type that has either oxygen or nitrogen in the ring, has only one group with an active amino hydrogen, contains no other active hydrogen groups, and has the amino group separated from the ring by from one to five carbon atoms. Representative additives include: the reaction product of either furfurylamine-or 3-(amino methyl) pyridine with a copolymer of vinyl acetate, maleic anhydride and mixed di-esters of fumaric acid and mixed $C_8$ to $C_{18}$ aliphatic alcohols; and the reaction product of 2-amino- propyl 4-ethyl pyridine with a copolymer of mixed $C_8$-$C_{12}$ methacrylates and itaconic acid.